United States Patent
Roberts et al.

(10) Patent No.: US 10,347,295 B1
(45) Date of Patent: *Jul. 9, 2019

(54) COMPUTING SYSTEM WITH VIDEO CONTENT GENERATION FEATURE

(71) Applicant: Gracenote, Inc., Emeryville, CA (US)

(72) Inventors: Dale T. Roberts, Santa Monica, CA (US); Michael Gubman, Oakland, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,618

(22) Filed: Jun. 19, 2018

Related U.S. Application Data (63) Continuation of application No. 15/209,452, filed on Jul. 13, 2016, now Pat. No. 10,037,780.

(51) Int. Cl.
| | |
|---|---|
| *H04N 5/77* | (2006.01) |
| *G11B 27/036* | (2006.01) |
| *H04N 21/262* | (2011.01) |
| *H04N 21/234* | (2011.01) |
| *H04N 21/854* | (2011.01) |
| *H04N 21/4223* | (2011.01) |
| *H04N 5/265* | (2006.01) |
| *H04N 5/247* | (2006.01) |
| *H04N 9/80* | (2006.01) |

(52) U.S. Cl.
CPC .......... *G11B 27/036* (2013.01); *H04N 5/247* (2013.01); *H04N 5/265* (2013.01); *H04N 21/23424* (2013.01); *H04N 21/26258* (2013.01); *H04N 21/4223* (2013.01); *H04N 21/854* (2013.01)

(58) Field of Classification Search
USPC ......................................... 386/223–226, 248
See application file for complete search history.

(56) References Cited

U.S. PATENT DOCUMENTS

| | | |
|---|---|---|
| 9,380,082 B1 | 6/2016 | Keiser et al. |
| 2011/0164105 A1 | 7/2011 | Lee et al. |
| 2011/0213683 A1 | 9/2011 | Betancourt |
| 2012/0081392 A1 | 4/2012 | Arthur |
| 2013/0182104 A1 | 7/2013 | Mangold et al. |
| 2013/0252223 A1 | 9/2013 | Jadcherla |
| 2014/0013361 A1 | 1/2014 | Monari et al. |
| 2016/0378788 A1 | 12/2016 | Panneer et al. |
| 2017/0026574 A1 | 1/2017 | Kwon et al. |
| 2017/0092329 A1 | 3/2017 | Kim et al. |
| 2017/0115749 A1 | 4/2017 | Li |
| 2017/0223282 A1 | 8/2017 | Geiss et al. |
| 2017/0289647 A1 | 10/2017 | Lee et al. |

*Primary Examiner* — Nigar Chowdhury (74) *Attorney, Agent, or Firm* — McDonnell Boehnen Hulbert & Berghoff LLP (57) ABSTRACT

In one aspect, an example method includes (i) receiving, by a computing system, first video content captured by a front-facing camera of an end-user device; (ii) receiving, by the computing system, second video content captured by a rear-facing camera of the end-user device, wherein the first video content is captured by the front-facing camera while the second video content is captured by the rear-facing camera; and (iii) using, by the computing system, the received first video content, the received second video content, and a DVE template to generate third video content that includes the received first video content and the received second video content.

20 Claims, 7 Drawing Sheets

| Story Title | Video Content Item Identifier | Duration | DVE Identifer |
|---|---|---|---|
| STORY A | VCI ID A | 00:02:00:00 | DVE ID A |
| STORY B | VCI ID B | 00:01:30:00 | |
| STORY C | | 00:00:30:00 | DVD ID C |
| STORY D | VCI ID D | 00:00:30:00 | |
| STORY E | VCI ID E | 00:00:30:00 | |
| COMMERCIAL BREAK | | | |
| STORY F | VCI ID F | 00:02:00:00 | DVE ID F |
| STORY G | | 00:01:30:00 | |
| STORY H | VCI ID H | 00:00:30:00 | |
| STORY I | VCI ID I | 00:00:30:00 | |

COMPUTING SYSTEM WITH VIDEO CONTENT GENERATION FEATURE

REFERENCE TO RELATED APPLICATION

This disclosure is a continuation of U.S. patent application Ser. No. 15/209,452, filed Jul. 13, 2016, the entirety of which is hereby incorporated by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) receiving, by a computing system, first video content captured by a front-facing camera of an end-user device; (ii) receiving, by the computing system, second video content captured by a rear-facing camera of the end-user device, wherein the first video content is captured by the front-facing camera while the second video content is captured by the rear-facing camera; and (iii) using, by the computing system, the received first video content, the received second video content, and a DVE template to generate third video content that includes the received first video content and the received second video content.

In another aspect, an example non-transitory computer-readable medium is disclosed. The computer-readable medium has stored thereon program instructions that upon execution by a processor, cause performance of a set of acts including (i) receiving, by a computing system, first video content captured by a front-facing camera of an end-user device; (ii) receiving, by the computing system, second video content captured by a rear-facing camera of the end-user device, wherein the first video content is captured by the front-facing camera while the second video content is captured by the rear-facing camera; and (iii) using, by the computing system, the received first video content, the received second video content, and a DVE template to generate third video content that includes the received first video content and the received second video content.

In another aspect, an example computing system is disclosed. The computing system is configured for performing a set of acts including (i) receiving, by the computing system, first video content captured by a front-facing camera of an end-user device; (ii) receiving, by the computing system, second video content captured by a rear-facing camera of the end-user device, wherein the first video content is captured by the front-facing camera while the second video content is captured by the rear-facing camera; and (iii) using, by the computing system, the received first video content, the received second video content, and a DVE template to generate third video content that includes the received first video content and the received second video content.

DETAILED DESCRIPTION

I. Overview

A video-production system (VPS) can generate and/or output a video program (e.g., a news program) in the form of video content. The VPS can include various components to facilitate this. For example, the VPS can include a scheduling system, which can create and/or edit a program schedule, perhaps based on input received from a user (e.g., a producer or technical director) via a user interface. Further, the VPS can include a sequencing system, which can process records in the program schedule, and based on the processed records, can control one or more components of the VPS to facilitate generating and/or outputting video content. The VPS can then transmit the video content to a video-broadcast system (VBS), which in turn can transmit the video content to an end-user device for presentation of the video content to an end-user.

In one example, the VPS can include an end-user device (e.g., a mobile phone or tablet computer) that includes a front-facing camera and a rear-facing camera. Generally, the front-facing camera is positioned and/or oriented such that it can capture a user of the end-user device and the rear-facing camera is positioned and/or oriented such that it can capture at least a portion of the user's environment that is located behind the end-user device.

Each of these cameras can enable the end-user device to capture video content. As such, the end-user device can use the front-facing camera to capture first video content, and the end-user device can use the rear-facing camera to capture second video content. In some instances, the end-user device can capture the first video content while capturing the second video content.

This setup can be desirable in various situations. For example, consider a situation in which the user of the end-user device is a news reporter who is on location at a news-worthy event. In this situation, the reporter can view and report on the event. While doing this, the news reporter can hold the mobile phone at arm's length, and the end-user device can capture first video content of the reporter reporting on the event, while the end-user device captures second video content of the event itself. The end-user device can then transmit the first and second video content to a DVE system, which can use the first and second video content, and a DVE template to generate third video content that includes the both the first video content and the second video content (e.g., side by side in adjacent regions). This can provide a simple way for a reporter to facilitate generating video content of both the reporter and the event. The VPS can then integrate the generated video content into the news program, which the VBS can broadcast to an end-user device for presentation to a user.

II. Example Architecture

A. Computing Device

Figure 1:
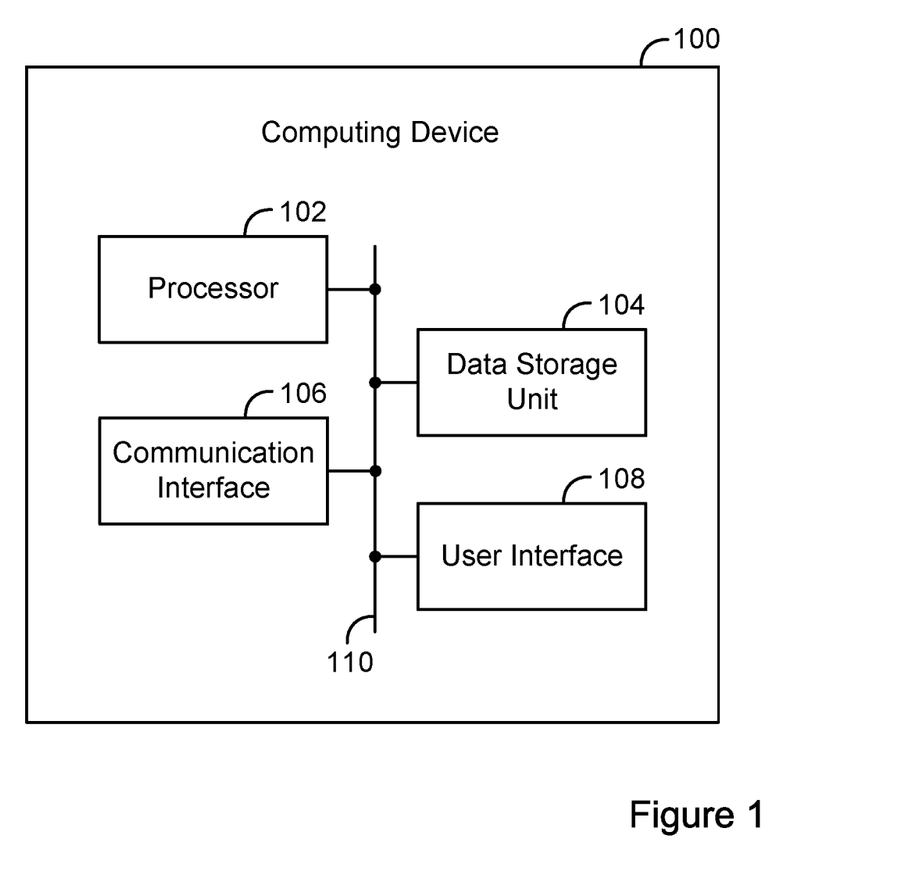
FIG. 1 is a simplified block diagram of an example computing device.

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another other entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, a set-top box, and/or a television.

B. Video System

Figure 2:
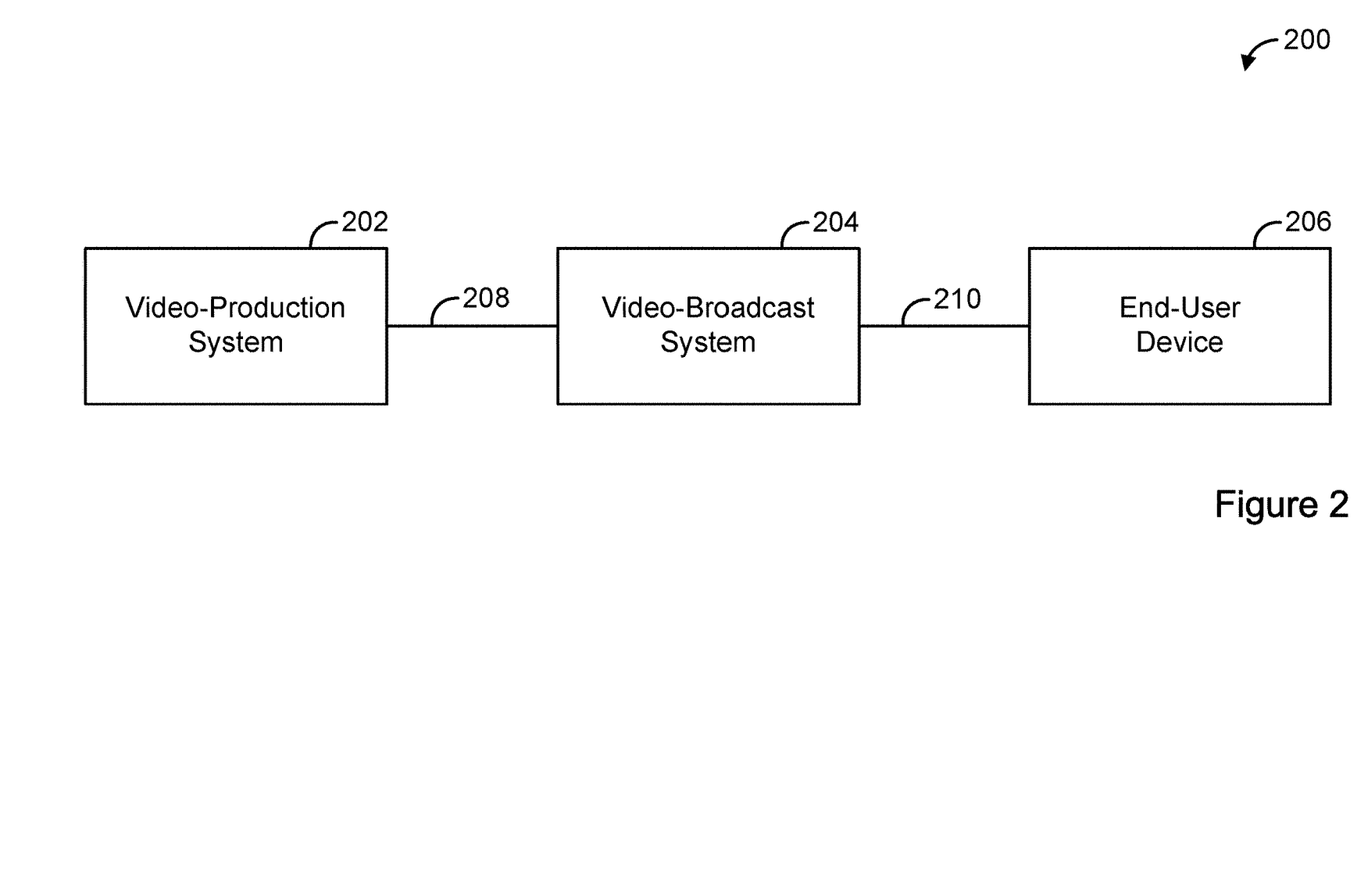
FIG. 2 is a simplified block diagram of an example video system.

FIG. 2 is a simplified block diagram of an example video system 200. The video system 200 can perform various acts and/or functions related to video content, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
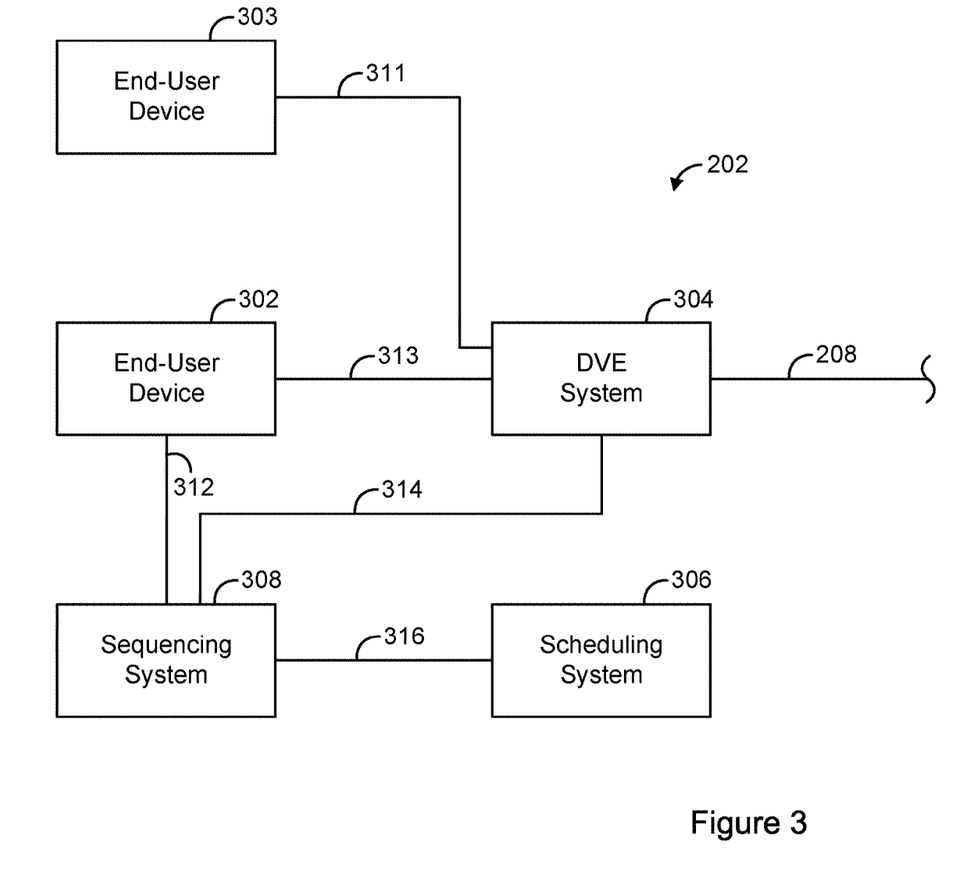
FIG. 3 is a simplified block diagram of an example video production system.

FIG. 3 is a simplified block diagram of an example VPS 202. The VPS 202 can include various components, such as a video source 302, an end-user device 303, a digital video-effect (DVE) system 304, a scheduling system 306, and a sequencing system 308, each of which can be implemented as a computing system. The VPS 202 can also include a connection mechanism 310, which connects the video source 302 with the DVE system 304; a connection mechanism 312, which connects the video source 302 with the sequencing system 308; a connection mechanism 313, which connects the end-user device 303 with the DVE system 304; a connection mechanism 314, which connects the DVE system 304 with the sequencing system 308; and a connection mechanism 316, which connects the scheduling system 306 with the sequencing system 308.

The video source 302 can take various forms, such as a character generator, a video server, a satellite receiver, a video camera, an end-user device, or a DVE system. An example character generator is the Viz Trio provided by Viz Rt™ of Bergen, Norway. An example video server is the K2 server provided by Grass Valley™ of San Francisco, Calif.

The end-user device 303 is an example type of video source and can take various forms, such as a mobile phone or a tablet computer. The end-user device 303 can include various components, such as a front-facing camera and a rear-facing camera.

Figure 4A:
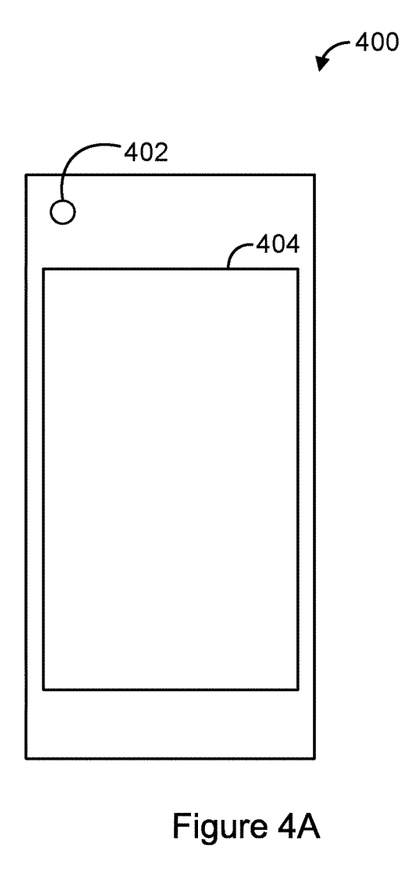
FIG. 4A is a simplified diagram of an example mobile phone, from a front view.
Figure 4B:
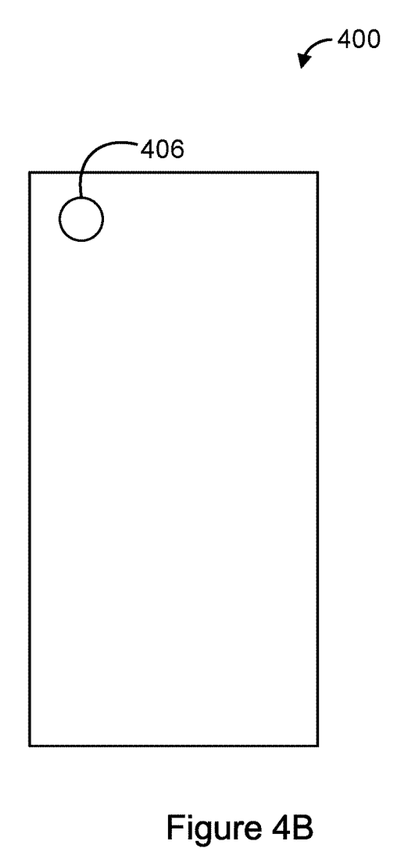
FIG. 4B is a simplified diagram of the example mobile phone of FIG. 4A, from a rear view.

FIGS. 4A and 4B are simplified diagrams of an example mobile phone 400. FIG. 4A is front view of the mobile phone 400 and FIG. 4B is a rear view of the mobile phone 400. The mobile phone 400 can include a front-facing camera 402, a display 404, and/or a rear-facing camera 406. Generally, the front-facing camera 402 is positioned and/or oriented such that it can capture a user of the mobile phone 400 (e.g., as the user is holding the mobile phone 400 and viewing the display 404) and the rear-facing camera 406 is positioned and/or oriented such that it can capture at least a portion of the user's environment that is located behind the mobile phone 400. Notably, the front-facing camera 402 and the rear-facing camera 406 do not need to be positioned exactly as shown in FIGS. 4A and 4B. Other end-user devices, such as a tablet computer, can be configured in the same or a similar manner.

The DVE system 304 can take various forms, such as a production switcher. An example production switcher is the Vision Octane production switcher provided by Ross Video Ltd. of Iroquois, Ontario in Canada.

The scheduling system 306 can take various forms. An example scheduling system is WO Traffic provided by WideOrbit, Inc. of San Francisco, Calif. Another example scheduling system is OSi-Traffic provided by Harris Corporation of Melbourne, Fla.

The sequencing system 308 can take various forms. A sequencing system is sometimes referred to in the industry as a "production automation system."

Referring back to FIG. 2, the VBS 204 can include various components, such as a terrestrial antenna or a satellite transmitter, each of which can be implemented as a computing system.

Each of the video-based entities described in this disclosure can include or be integrated with a corresponding audio-based entity. Likewise, the video content described in this disclosure can include or be integrated with corresponding audio content.

III. Example Operations

The video system 200 and/or components thereof can perform various acts and/or functions. These and related features will now be described.

The video system 200 can perform various acts and/or functions related to video content. For example, the video system 200 can receive, generate, output, and/or transmit a video program in the form of video content. In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. In this context, the video source 302 and/or the end-user device 303 can generate and/or output video content, and can transmit the video content to the DVE system 304. In practice, the VPS 202 is likely to include multiple video sources and corresponding connection mechanisms.

As noted above, the video source 302 can take the form of a character generator. A character generator can generate video content based on input data. For example, a character generator can receive weather data and can then generate video content that includes the weather data. In some instances, a character generator can use an ordered set of content items to generate video content that includes the content items in the specified order. This type of generated video content is sometimes referred to in the industry as a "ticker." The content items can include various types of content, such as text and/or images. The ordered set of content items can be stored in various forms, such as in the form of an Extensible Markup Language (XML) file.

As also noted above, the video source 302 can also take the form of a video server. A video server can store video content (e.g., in the form of a file). Further, the video server can use the stored video content to generate and output a video stream representing the video content. This is sometimes referred to in the industry as the video server playing out the video content. The video server 302 can then transmit the video stream, thereby transmitting the video content, to the DVE system 304.

As noted above, the end-user device 303 can include a front-facing camera and a rear-facing camera. Each of these cameras can enable the end-user device 303 to capture video content. As such, the end-user device 303 can use the front-facing camera to capture first video content, and the end-user device 303 can use the rear-facing camera 406 to capture second video content. In some instances, the end-user device 303 can capture the first video content while capturing the second video content. The first video content and the second video content can be used to generate third video content that includes the first video content and the second video content, in synchronized manner.

This can be desirable in various situations. For example, consider a situation in which the user of the end-user device 303 is a news reporter who is on location at a news-worthy event. In this situation, the reporter can view and report on the event. While doing this, the news reporter can hold the end-user device 303 at arm's length, and the end-user device 303 can capture first video content of the reporter reporting on the event, while the end-user device 303 captures second video content of the event itself. In another example, instead of the reporter holding the end-user device 303, the end-user device 303 can be mounted on a stand, such as a tripod stand.

The end-user device can then transmit the captured first video content and the captured second video content to the DVE system 304.

The DVE system 304 can perform various acts and/or functions related to DVEs. For example, the DVE system 304 can create and/or edit a DVE template, perhaps based on input received from a user via a user interface. Further, the DVE system 304 can use a DVE template, and perhaps video content or other content, to generate and/or output video content. This is sometimes referred to in the industry as the DVE system "executing a DVE." The DVE system 304 can then transmit the generated video content to the VBS 204.

A DVE template can be configured in various ways, which can allow the DVE system to execute various types of DVEs. In one example, a DVE template can specify that the DVE system 304 is to receive first video content and second video content, and is to generate video content that includes the first video content and the second video content, each down-scaled and contained within a respective one of two regions positioned side-by-side. As such, the DVE system 304 can generate video content by scaling and/or re-positioning video content.

Figure 5:
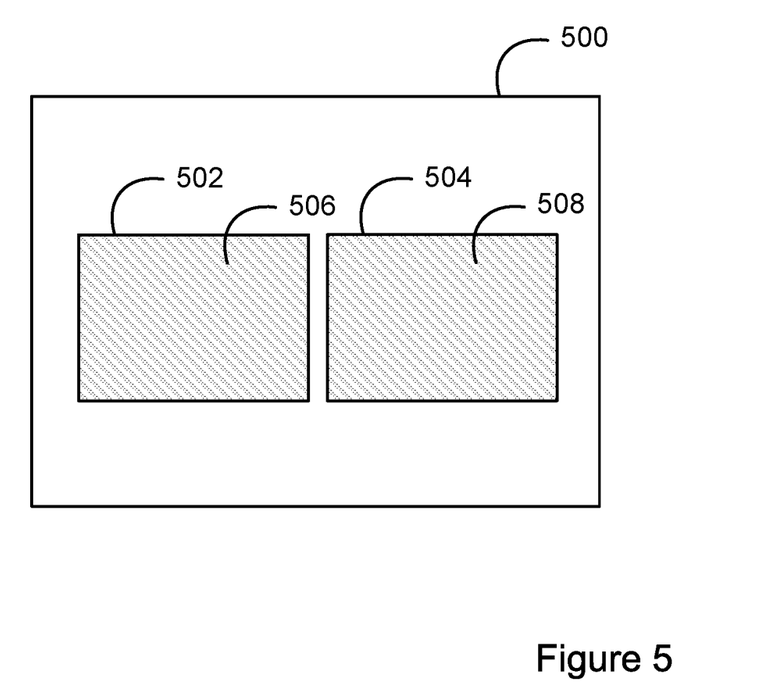
FIG. 5 is a simplified diagram of an example frame of video content.

FIG. 5 helps illustrate this concept. FIG. 5 is a simplified depiction of an example frame 500 of video content. The frame 500 includes two video content regions, namely a first region 502 and a second region 504. Further, the frame 500 includes a frame 506 of first video content positioned within the first region 502, and includes a frame 508 of second video content positioned within the second region 504.

In some cases, A DVE template can specify where the DVE is to obtain content to be used in connection with executing a DVE. For example, the DVE template can specify that the DVE system is to receive video content on a particular input of the DVE system 304. As another example, the DVE template can specify that the DVE system 304 is to retrieve content from a particular storage location within the data storage unit of the DVE system 304. Thus, the DVE system 304 can obtain content for use in connection with executing a DVE in various ways, such as by receiving video content from the video source 302 or by retrieving content from a particular storage location within a data storage unit of the DVE system 304.

In some instances, the DVE system 304 can select a DVE template from among a set of selectable DVE templates, and can then use the selected template to execute a corresponding DVE. As noted above, the DVE system 304 can create and/or edit a DVE template. When the DVE system 304 does this, the DVE system 304 can generate and store corresponding program instructions for later retrieval and execution. Given this, the act of the DVE system 304 executing a DVE can include the DVE system 304 retrieving and executing program instructions corresponding to a DVE template. Also, in some instances, the DVE system 304 can execute multiple DVEs in serial or overlapping fashion.

As noted above, the end-user device 303 can transmit first video content captured by the front-facing camera of the end-user device 303 to DVE system 304, and can transmit second video content captured by the front-facing camera of the end-user device 303 to DVE system 304. As such, DVE system 304 can receive the first video content, and can receive the second video content. DVE system 304 can then use the received first video content, the received second video content, and a DVE template to generate third video content that includes the received first video content and the received second video content.

The scheduling system 306 can perform acts and/or functions related to scheduling and/or managing video content production. For example, the scheduling system 306 can create and/or edit a program schedule of a video program, perhaps based on input received from a user via a user interface. The sequencing system 308 can then process records in the program schedule. This can cause the sequencing system 308 to control one or more other components of the VPS 202 to facilitate the VPS 202 generating and/or outputting video content, which can serve as or be part of a video program. As such, based on a program schedule, the sequencing system 308 can control the video source 302 and/or the DVE system 304.

A program schedule (sometimes referred to in the industry as a "rundown") serves as a schedule or outline of a video program and can include multiple records. A video program can be conceptually divided into multiple logically-separated portions (sometimes referred to in the industry as "stories"). As such, each portion of the video program can be represented by a separate record of the program schedule. In some cases, each record can also include one or more sub records. Each record (including a sub record) can include various types of data.

Figure 6:
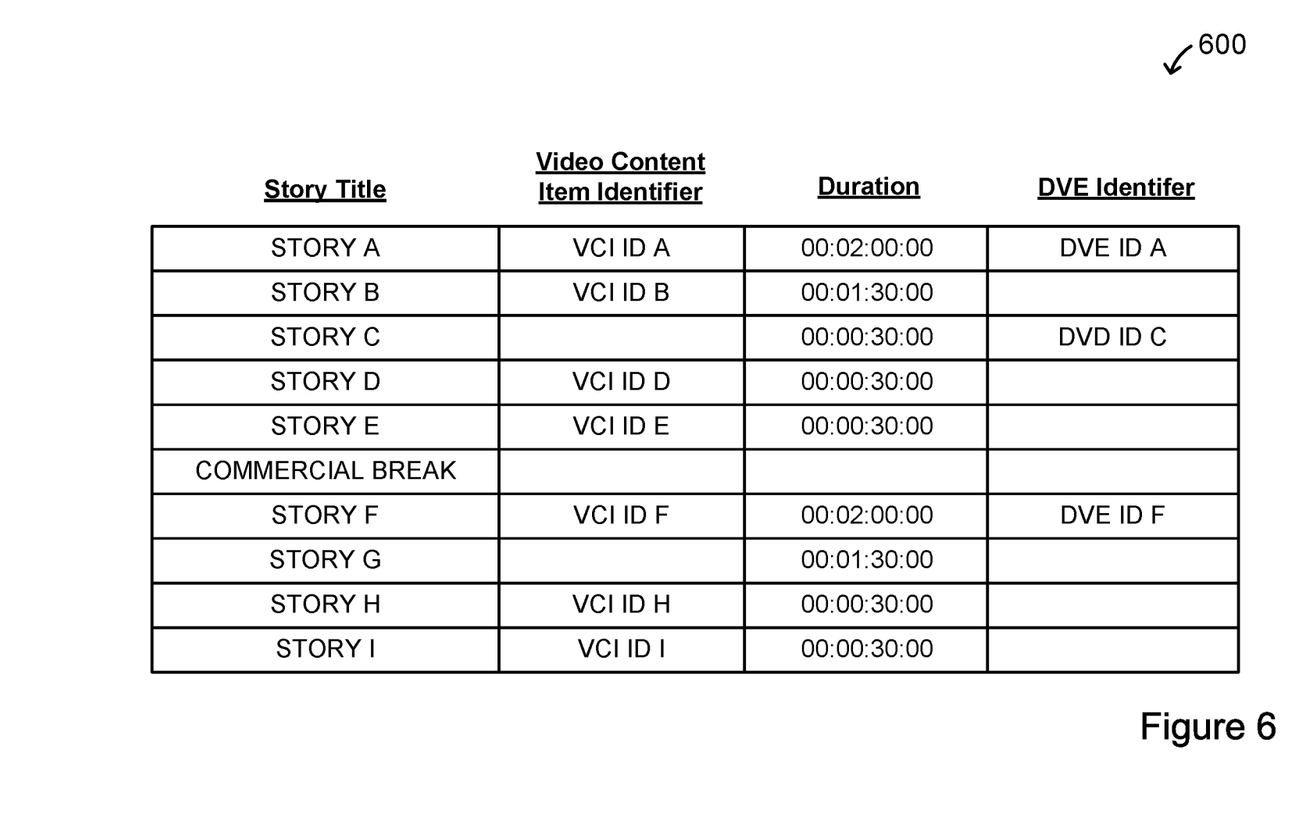
FIG. 6 is a simplified block diagram of an example program schedule.

FIG. 6 is a simplified diagram of an example program schedule 600. The program schedule 600 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video-content item identifier, a duration, and a DVE identifier (which can serve as an instruction to execute the identified DVE).

A video-content item can consist of logically-related video content. For example, a video-content item can be a commercial. As another example, a video-content item can be a portion of a television program that is scheduled between two commercial breaks. This is sometimes referred to in the industry as a "program segment."

As shown in FIG. 6, the first record specifies a story title of STORY A, a video content identifier of VCI ID A, a duration of 00:02:00:00 (in hours::minutes::seconds::frames format), and a DVE identifier of DVE ID A. As such, upon the sequencing system 308 processing the first record, the sequencing system 308 can cause the video source 302 to playout a video-content item identified by the identifier VCI ID A for two minutes, and further can cause the DVE system 304 to execute a DVE identified by the identifier DVE ID A, which for example, can cause the DVE system 304 to overlay content on the identified video-content item.

As further shown in FIG. 6, the third record specifies a story title of STORY C, a duration of 00:00:30:00 (in hours::minutes::seconds::frames format), and a DVE identifier of DVE ID C. As such, upon the sequencing system 308 processing the third record, the sequencing system 308 can cause the DVE system 304 to execute a DVE identified by the identifier DVE ID C, which for example, can cause the DVE system 304 to receive first video content and second video content from the end-user device 303, and to use the received first and second video content and a DVE template to generate third video content that includes the first and second video content as discussed above.

It should be noted that the program schedule 600 has been greatly simplified for the purposes of illustrating certain features. In practice, a program schedule is likely to include significantly more data.

In some instances, the sequencing system 308 can process a next record in the program schedule based on a trigger event. In one example, the trigger event can be the sequencing system 308 completing one or more actions related to a current record in the program schedule. In another example, the trigger event can be the sequencing system 308 receiving input from a user via a user interface.

Referring back to FIG. 2, the VBS 204 can receive video content from the VPS 202, which in turn can transmit the video content to the end-user device 206 for presentation of the video content to an end user. In practice, the VBS 204 can transmit video content to a large number of end-user devices for presentation of the video content to a large number of end users. The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

In one example, in the case where the VBS 204 broadcasts generated third video content that includes first video content and second video content, the VBS 204 can broadcast the generated third video content within a time period (e.g., within 10 seconds) from within when a corresponding portion of the first video content was captured by a front-facing camera of the end-user device 303, and within a time period (within 10 seconds) from within when a corresponding portion of the second video content was captured by a rear-facing camera of the end-user device 303. This can provide for a real-time or near real-time broadcast of video content.

Figure 7:
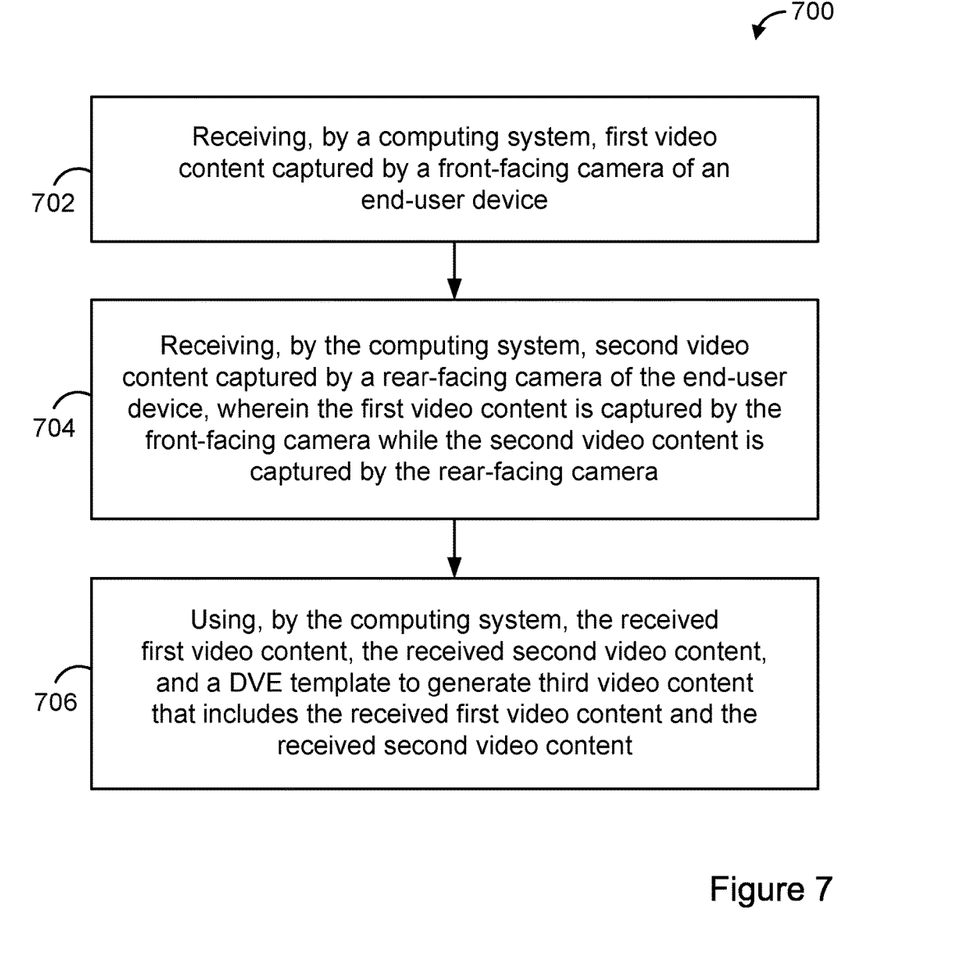
FIG. 7 is a flow chart of an example method.

FIG. 7 is a flow chart illustrating an example method 700.

At block 702, the method 700 can include receiving, by a computing system, first video content captured by a front-facing camera of an end-user device.

At block 704, the method 700 can include receiving, by the computing system, second video content captured by a rear-facing camera of the end-user device, wherein the first video content is captured by the front-facing camera while the second video content is captured by the rear-facing camera.

At block 706, the method 700 can include using, by the computing system, the received first video content, the received second video content, and a DVE template to generate third video content that includes the received first video content and the received second video content.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   receiving, by a computing system, first video content captured by a front-facing camera of an end-user device;
   receiving, by the computing system, second video content captured by a rear-facing camera of the end-user device, wherein the first video content is captured by the front-facing camera while the second video content is captured by the rear-facing camera;
   accessing, by the computing system, a program schedule of a video program;
   based on the accessed program schedule, selecting, by the computing system, a digital video effect (DVE) template for generating third video content that includes the received first video content and the received second video content; and
   using, by the computing system, the received first video content, the received second video content, and the selected DVE template to generate the third video content that includes the received first video content and the received second video content.

2. The method of claim 1, wherein the computing system is a video production system (VPS) comprising a production switcher and a sequencing system configured to control one or more operations of the production switcher;
   wherein receiving, by the computing system, the first video content comprises receiving, by the production switcher of the VPS, the first video content;
   wherein receiving, by the computing system, the second video content comprises receiving, by the production switcher of the VPS, the second video content;
   wherein accessing, by the computing system, the program schedule comprises accessing, by the sequencing system of the VPS, the program schedule;
   wherein selecting, by the computing system, the DVE template comprises selecting, by the sequencing system of the VPS, the DVE template; and
   wherein using, by the computing system, the received first video content, the received second video content, and the DVE template to generate the third video content comprises causing, by the sequencing system of the VPS, the production switcher to use the received first video content, the received second video content, and the DVE template to generate the third video content.

3. The method of claim 1, wherein the end-user device is a mobile phone.

4. The method of claim 1, wherein the end-user device is a tablet computer.

5. The method of claim 1, wherein the generated third video content includes a first region and a second region, wherein the first video content of the generated third video content is positioned in the first region, and wherein the second video content of the generated third video content is positioned in the second region.

6. The method of claim 1, wherein the end-user device is a first end-user device, the method further comprising:
   broadcasting, by the computing system, to a second end-user device, the generated third video content.

7. The method of claim 6, wherein broadcasting the generated third video content comprises broadcasting a portion of the generated third video content (i) within 10 seconds from when a corresponding portion of the first video content was captured by the front-facing camera of the first end-user device, and within 10 seconds from when a corresponding portion of the second video content was captured by the rear-facing camera of the first end-user device.

8. A non-transitory computer-readable medium having stored thereon program instructions that upon execution by a processor, cause performance of a set of acts comprising:
   receiving, by a computing system, first video content captured by a front-facing camera of an end-user device;
   receiving, by the computing system, second video content captured by a rear-facing camera of the end-user device, wherein the first video content is captured by the front-facing camera while the second video content is captured by the rear-facing camera;
   accessing, by the computing system, a program schedule of a video program;
   based on the accessed program schedule, selecting, by the computing system, a digital video effect (DVE) template for generating third video content that includes the received first video content and the received second video content; and
   using, by the computing system, the received first video content, the received second video content, and the selected DVE template to generate the third video content that includes the received first video content and the received second video content.

9. The non-transitory computer-readable medium of claim 8, wherein the computing system is a video production system (VPS) comprising a production switcher and a sequencing system configured to control one or more operations of the production switcher;
   wherein receiving, by the computing system, the first video content comprises receiving, by the production switcher of the VPS, the first video content;
   wherein receiving, by the computing system, the second video content comprises receiving, by the production switcher of the VPS, the second video content;

wherein accessing, by the computing system, the program schedule comprises accessing, by the sequencing system of the VPS, the program schedule;

wherein selecting, by the computing system, the DVE template comprises selecting, by the sequencing system of the VPS, the DVE template; and wherein using, by the computing system, the received first video content, the received second video content, and the DVE template to generate the third video content comprises causing, by the sequencing system of the VPS, the production switcher to use the received first video content, the received second video content, and the DVE template to generate the third video content.

10. The non-transitory computer-readable medium of claim 8, wherein the end-user device is a mobile phone.

11. The non-transitory computer-readable medium of claim 8, wherein the end-user device is a tablet computer.

12. The non-transitory computer-readable medium of claim 8, wherein the generated third video content includes a first region and a second region, wherein the first video content of the generated third video content is positioned in the first region, and wherein the second video content of the generated third video content is positioned in the second region.

13. The non-transitory computer-readable medium of claim 8, wherein the end-user device is a first end-user device, the set of acts further comprising:
broadcasting, by the computing system, to a second end-user device, the generated third video content.

14. The non-transitory computer-readable medium of claim 13, wherein broadcasting the generated third video content comprises broadcasting a portion of the generated third video content (i) within 10 seconds from when a corresponding portion of the first video content was captured by the front-facing camera of the first end-user device, and within 10 seconds from when a corresponding portion of the second video content was captured by the rear-facing camera of the first end-user device.

15. A computing system configured for performing a set of acts comprising:
receiving, by the computing system, first video content captured by a front-facing camera of an end-user device;
receiving, by the computing system, second video content captured by a rear-facing camera of the end-user device, wherein the first video content is captured by the front-facing camera while the second video content is captured by the rear-facing camera;
accessing, by the computing system, a program schedule of a video program;
based on the accessed program schedule, selecting, by the computing system, a digital video effect (DVE) template for generating third video content that includes the received first video content and the received second video content; and
using, by the computing system, the received first video content, the received second video content, and the selected DVE template to generate the third video content that includes the received first video content and the received second video content.

16. The computing system of claim 15, wherein the computing system is a video production system (VPS) comprising a production switcher and a sequencing system configured to control one or more operations of the production switcher;

wherein receiving, by the computing system, the first video content comprises receiving, by the production switcher of the VPS, the first video content;

wherein receiving, by the computing system, the second video content comprises receiving, by the production switcher of the VPS, the second video content;

wherein accessing, by the computing system, the program schedule comprises accessing, by the sequencing system of the VPS, the program schedule;

wherein selecting, by the computing system, the DVE template comprises selecting, by the sequencing system of the VPS, the DVE template; and wherein using, by the computing system, the received first video content, the received second video content, and the DVE template to generate the third video content comprises causing, by the sequencing system of the VPS, the production switcher to use the received first video content, the received second video content, and the DVE template to generate the third video content.

17. The computing system of claim 15, wherein the end-user device is a mobile phone.

18. The computing system of claim 15, wherein the end-user device is a tablet computer.

19. The computing system of claim 15, wherein the generated third video content includes a first region and a second region, wherein the first video content of the generated third video content is positioned in the first region, and wherein the second video content of the generated third video content is positioned in the second region.

20. The computing system of claim 15, wherein the end-user device is a first end-user device, the set of acts further comprising:
broadcasting, by the computing system, to a second end-user device, the generated third video content.

* * * * *